US011328692B2

(12) United States Patent
Cartier et al.

(10) Patent No.: US 11,328,692 B2
(45) Date of Patent: May 10, 2022

(54) HEAD-MOUNTED SITUATIONAL AWARENESS SYSTEM AND METHOD OF OPERATION

(71) Applicants: Alexandra Cartier, Niagara Falls, NY (US); Gary England, Buffalo, NY (US)

(72) Inventors: Alexandra Cartier, Niagara Falls, NY (US); Gary England, Buffalo, NY (US)

(*) Notice: Subject to any disclaimer, the term of this patent is extended or adjusted under 35 U.S.C. 154(b) by 148 days.

(21) Appl. No.: 16/987,274

(22) Filed: Aug. 6, 2020

(65) Prior Publication Data
US 2021/0043167 A1 Feb. 11, 2021

Related U.S. Application Data

(60) Provisional application No. 62/883,291, filed on Aug. 6, 2019.

(51) Int. Cl.
G09G 5/32 (2006.01)
G06F 3/01 (2006.01)
G10K 11/178 (2006.01)
H04R 1/40 (2006.01)
G10L 15/22 (2006.01)
G10L 15/26 (2006.01)
(Continued)

(52) U.S. Cl.
CPC ............ G09G 5/32 (2013.01); G06F 3/011 (2013.01); G09G 5/38 (2013.01); G10K 11/178 (2013.01); G10L 15/22 (2013.01); G10L 15/26 (2013.01); H04R 1/406 (2013.01); H04R 3/005 (2013.01); G09G 2354/00 (2013.01); H04L 67/10 (2013.01)

(58) Field of Classification Search
CPC ........ G09G 5/32; G09G 5/38; G09G 2354/00; G06F 3/011; G06F 3/012; G10L 15/22; G10L 15/26; G10K 11/178; G10K 11/17823; G10K 11/17873; G10K 11/34; H04R 1/406; H04R 3/005; H04R 29/008; H04R 2201/403; H04R 2420/07; H04R 2499/15; H04R 1/028; H04R 1/1083; H04R 2460/07; H04R 25/55; H01L 67/10
See application file for complete search history.

(56) References Cited

U.S. PATENT DOCUMENTS 5,903,870 A 5/1999 Kaufman
6,474,816 B2 11/2002 Butler et al.
(Continued)

Primary Examiner — Jeffery A Brier
(74) Attorney, Agent, or Firm — Vincent G. LoTempio

(57) ABSTRACT

A head-mounted situational awareness system and method of operation provides a head gear with a retinal display, and multiple sensory-related electrical components. A microphone array and a motion sensor are integrated into head gear. The microphone array detects incoming audio signals to generate an audio signal. The motion sensor detects position and orientation of head gear relative to audio source to generate a position signal. A processor utilizes speech-to-text software to translate the sound to text for display on retinal display. The processor utilizes a position algorithm and triangulation functions to generate a position graphic of audio source. Noise cancelling software reduces background noise to sound. A remote subsystem, or command center, communicates audio signal and position signal with the head gear to receive an audio picture of the area, and also to generate actionable information that displays in real time on the retinal display of head gear.

20 Claims, 8 Drawing Sheets

(51) Int. Cl.
*G09G 5/38* (2006.01)
*H04R 3/00* (2006.01)
*H04L 67/10* (2022.01)

(56) References Cited

U.S. PATENT DOCUMENTS

| | | |
|---|---|---|
| 6,975,991 B2 | 12/2005 | Basson et al. |
| 8,183,997 B1 | 5/2012 | Wong et al. |
| 9,886,848 B2 | 2/2018 | Lee et al. |
| 10,015,592 B2 | 7/2018 | Yoshida et al. |
| 10,198,920 B1 | 2/2019 | Yoneoka |
| 10,338,766 B2 | 7/2019 | Parkinson et al. |
| 2016/0377381 A1* | 12/2016 | Lyren ...................... F41H 13/00 345/633 |
| 2019/0187476 A1* | 6/2019 | Serdarevic ............ A61F 2/1451 |

\* cited by examiner

HEAD-MOUNTED SITUATIONAL AWARENESS SYSTEM AND METHOD OF OPERATION

CROSS REFERENCE OF RELATED APPLICATIONS

This application claims the benefits of U.S. provisional application No. 62/883,291, filed Aug. 6, 2019 and entitled HEAD-MOUNTED SITUATIONAL AWARENESS SYSTEM AND METHOD OF OPERATION, which provisional application is incorporated by reference herein in its entirety.

FIELD OF THE INVENTION

The present invention relates generally to a head-mounted situational awareness system and method of operation. More so, the situational awareness system provides a head gear with a retinal display; and further includes a microphone array and a motion sensor integrated into the head gear; whereby the microphone array detects incoming audio signals to generate an audio signal, and the motion sensor detects the location of the audio source relative to the head gear to generate a position signal; whereby a processor utilizes speech-to-text software to translate the sound to text for display on the retinal display; and whereby the processor utilizes a position algorithm and triangulation functions to generate a position graphic of the audio source; whereby noise cancelling software reduces background noise to the sound; and whereby a remote subsystem, or command center, communicates the audio signal and the position signal with the head gear to receive an audio picture of the area, and also to generate actionable information that displays in real time on the retinal display of the head gear.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Those skilled in the art will recognize that audio situational awareness is a technique that monitors the surrounding environment for active audio sources, including speech and other sounds. Audio situational awareness provides spatial detection to identify and associate successive audio signals from the same source with that source to present a consistent view of the audio environment. This can be useful for the deaf and hard of hearing.

Typically, microphones convert sound into electrical signals. However, the paradigm of a single microphone often does not work effectively because the microphone picks up ambient noise signals in addition to the desired sound. This is especially the case when the distance between the microphone and an audio source is more than a few inches. Thus, to mitigate the drawbacks of the single microphone, a microphone array is used to achieve directional gain in a preferred spatial direction while suppressing ambient noise from other directions.

In many instances, microphone array beamforming is used to capture the audio signals originating from a detected source. Audio signal events from speech sources may be translated to text while other audio sources may be identified by integrated electronics. Often, motion detection determines the relative position of the device to an absolute reference source, e.g. North, and is used to provide the relative location of active audio sources in the surrounding environment.

Typically, a motion sensor is an electric device that utilizes a sensor, such as an infra-red light directed outwardly, to detect nearby motion. The motion sensor is often integrated into a system that automatically performs a task or alerts when motion is detected. An active motion sensor is embedded in a computer chip electrical circuit. The various types of sensors may include, without limitation, an optical sensor, a microwave sensor, and an acoustic sensor, as well as a transmitter. A passive sensor contains only a sensor and senses a signature from the moving object, such as emission or reflections thereof.

It is also recognized in the art that a display generator can be used to generate an image of an audio event onto the user's retina either directly or via an intermediary lens or other device. The audio event information is displayed to the user along with an audio source identifier and location relative to the user. As such, a user may be presented a sequence of audio events separated and identified by active source. This may be a transcript of a group discussion with multiple speakers such as at a meeting or social gathering.

Other proposals have involved sound devices that capture audio and triangulate the audio to determine the direction of the source. The problem with these sound devices is that they do not account for movement by the audio source or the microphone. Also, they cannot convert the sound, such as a voice in to readable text for the user. Even though the above cited sound devices meet some of the needs of the market, a head-mounted situational awareness system that combines head gear, such as eye glasses, with a microphone array and a motion sensor to monitor the audio environment, capture and translate speech to text, and display the audio situation to the user, is still desired.

SUMMARY

Illustrative embodiments of the disclosure are generally directed to a head-mounted situational awareness system and method of operation. The head-mounted situational awareness system combines head gear, such as eye glasses, with a microphone array and a motion sensor to monitor the audio environment, capture and translate speech to text, and display the audio situation to the user. The situational awareness system combines a head gear with a retinal display, and multiple sensory-related electrical components. A microphone array and a motion sensor are integrated into the head gear. The microphone array detects incoming audio signals to generate an audio signal. The motion sensor detects the location of the audio source relative to the head gear to generate a position signal. A processor utilizes speech-to-text software to translate the sound to text for display on the retinal display. The processor utilizes a position algorithm and triangulation functions to generate a position graphic of the audio source. Noise cancelling software reduces background noise to the sound. A remote subsystem, or command center, communicates the audio signal and the position signal with the head gear to receive an audio picture of the area, and also to generate actionable information that displays in real time on the retinal display of the head gear.

In one embodiment, a head-mounted situational awareness system comprises a head gear having a frame and a lens. A retinal display is operatively disposed in the lens.

In some embodiments, the system provides a microphone array that is operatively disposed in the frame. The microphone array is configured to detect sound from one or more audio sources. The microphone array is also operable to record an audio signal from the sound emanating from the audio sources.

In some embodiments, the system provides a motion sensor that is operatively disposed in the frame. The motion sensor is operable to detect the position and orientation of the frame relative to the audio sources. The motion sensor is also configured to record a generated position signal that is based on the position of the frame of the head gear relative to the audio sources.

In some embodiments, the system provides a processor that is operatively connected to the microphone array, the motion sensor, the display generator, and the retinal display, the processor operable to process the audio signal and the position signal.

The processor comprises a speech to text algorithm that is configured to translate the audio signal to a text. The retinal display is operable to display the text.

The processor also comprises a position algorithm that is configured to the position of the frame relative to the audio sources. The retinal display is operable to display a position graphic representative of the position of the frame relative to the audio sources.

In another aspect, the headgear comprises a pair of glasses.

In another aspect, the frame comprises a pair of arms.

In another aspect, the weight of the microphone array, the motion sensor, and the display generator are substantially balanced along the length of the arms.

In another aspect, the motion sensor is operable to track movement of the audio source in nine dimensions with a 3-axis accelerometer, a 3-axis gyroscope, and a 3-axis magnetometer. In essence, the motion sensor tracks movement of the wearer's head (head gear 102); consequently, tracking movement of the audio source relative to the current position and orientation of the head gear 102.

In another aspect, the system also provides a remote subsystem that is operable to receive and store at least one of the following: the audio signal, the position signal, the text, and the position graphic.

In another aspect, the remote subsystem comprises a cloud having a private domain.

In another aspect, the system also provides a radio frequency interface that is operationally disposed in the frame, the radio frequency interface operable to transmit the audio signal, the position signal, and the sensory signal to the remote subsystem.

In another aspect, the radio frequency interface comprises an integrated circuit radio frequency interface.

In another aspect, the position algorithm comprises a time difference of arrival function.

In another aspect, the processor comprises a noise cancellation algorithm for cancelling a background noise from the audio signal.

In another aspect, the microphone array comprises a beamforming unit for increasing a signal to noise ratio of the audio signal.

In another aspect, the system also provides a display generator that is operatively connected to the retinal display, the display generator is operable to generate a sensory data based on the audio signal and the position signal.

In another aspect, the system also provides a power source that is operatively attached to the frame.

In another aspect, the processor is operable to reduce power consumption of the power source.

One objective of the present invention is to provide a head gear, such as glasses, having various audio and motion sensory components that is operable to identify an audio source and the location of the sound emanating therefrom through.

Yet another objective is to help the deaf and hard of hearing recognize when someone is speaking, displays what they are saying and where they are located. With this system, the deaf and hard of hearing can engage in group conversations in the community, classroom and workplace to improve their educational outcomes and increase their employment opportunities.

Another possible objective is to provide speech-to-text software in the head gear to convert a voice to text that is viewable on a retinal display of the head gear.

Another objective is to display text on a retinal display of the head gear, where the text is based on a voice emanating from an audio source.

Yet another objective is to assist the deaf and hard of hearing in recognizing when someone is speaking, and display what is being said and where the speaker is located.

Another objective is to enable the deaf and hard of hearing to identify who is speaking and what is being said during interactions.

Yet another objective is to help the wearer to identify the direction of an audio source and the intensity level of the audio source.

An exemplary objective is to allow the deaf and hard of hearing to improve their educational outcomes and increase their employment opportunities by engaging in group conversations in the community, classroom, and the workplace.

Another possible objective is to identify speech and other audio, which is useful for first responders, law enforcement, search and rescue, and military applications. For example, multiple teams of users wearing the devices in a coordinated area of operations, such as law enforcement, first responders, search and rescue etc. These entities are able to move freely around an area, and then feed the captured audio signals, via radio communications, to a central processing unit or command post.

Additional objectives include providing a comfortable to wear pair of glasses, or other head-mounted gear for carrying the retinal display and other electrical components.

Yet another objective is to provide an easy to operate head-mounted situational awareness system.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims and drawings.

BRIEF DESCRIPTION OF THE DRAWINGS

The invention will now be described, by way of example, with reference to the accompanying drawings, in which:

FIG. 1A shows head-mounted gear and FIG. 1B illustrates multiple audio sources transmitting sound signals to the microphone array in the head-mounted gear, in accordance with an embodiment of the present invention;

Like reference numerals refer to like parts throughout the various views of the drawings.

DETAILED DESCRIPTION OF THE INVENTION

Figure 1A:
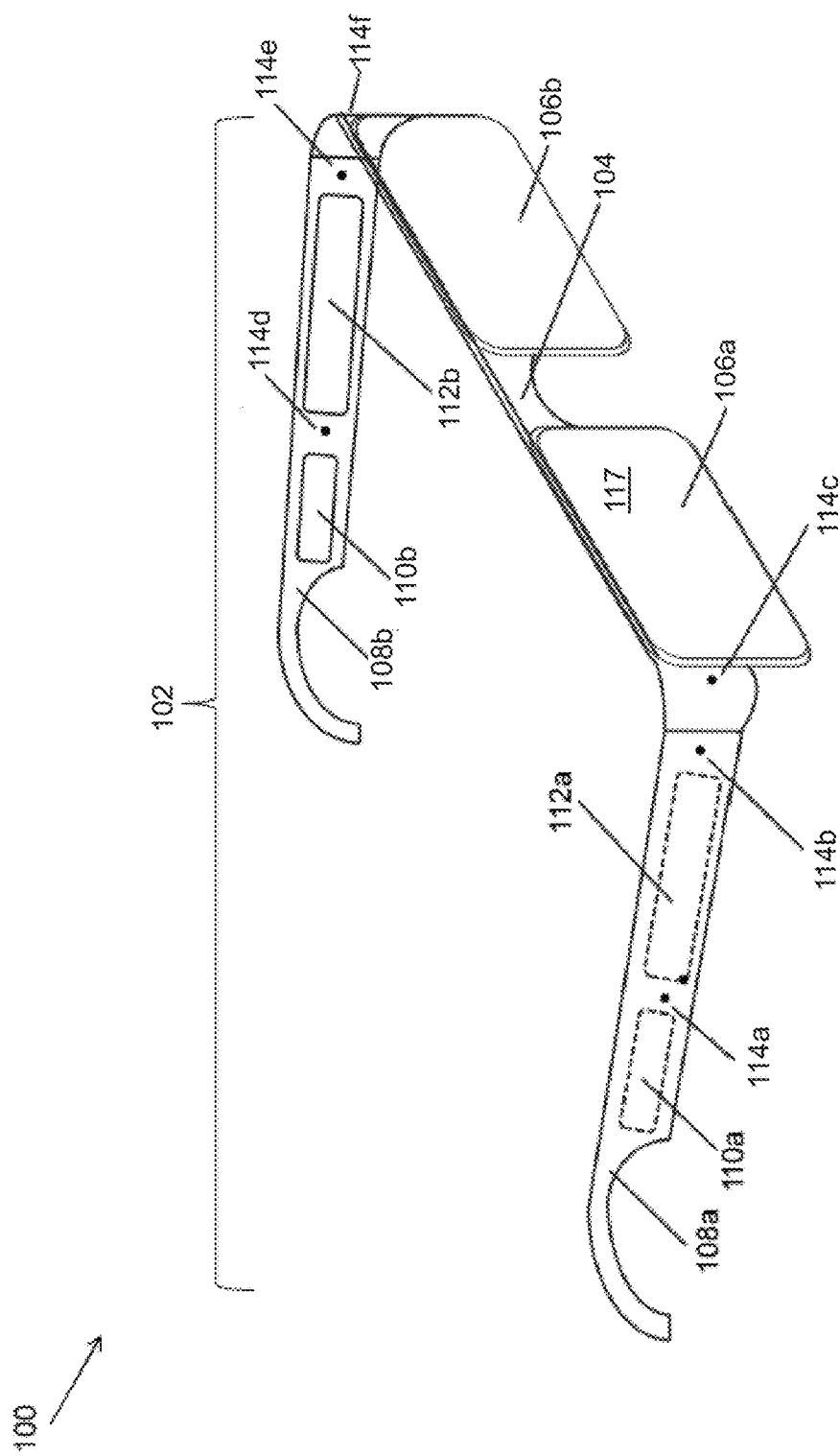
FIGS. 1A-1B illustrate a perspective view of an exemplary head-mounted situational awareness system, where

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1A. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting, unless the claims expressly state otherwise.

A head-mounted situational awareness system 100 and method 800 of operation is referenced in FIGS. 1A-8. As referenced in FIG. 1A, head-mounted situational awareness system 100, hereafter "system 100" combines a head gear 102 with a retinal display, and multiple sensory-related electrical components. This allows system 100 to monitor the audio environment, capture and translate speech to text, and display the audio situation to the user.

In one embodiment, the sensory-related electrical components include: a microphone array 114a-f, a motion sensor 302, a processor 308, a display generator 306, and Bluetooth technology for remote communication with a remote subsystem 300. A microphone array 114a-f in the head gear 102 receives and triangulates sound from one or more incoming audio signals to determine an audio source 116a-b and record an audio signal 310 therefrom. The motion sensor 302 in the head gear 102 detects the position of the audio source 116a-b relative to the head gear 102 to record a position signal 312. In essence, the motion sensor tracks movement of the wearer's head (head gear 102); consequently, tracking movement of the audio source relative to the current position and orientation of the head gear 102. In one example of use, motion sensor 302 measures the position and orientation of a pair of smart glasses, so as to determine the location of the audio source to an absolute reference, e.g., North.

A processor 308 is operatively connected to both the microphone array 114a-f and the motion sensor 302. Processor 308 determines from where the audio source 116a-b originated based on measurements by the microphone array 114a-f and the motion sensor 302. Processor 308 analyzes the audio signal 310 to determine the type of audio, and translate to text. Processor 308 also analyzes the position signal 312 to determine the location of the head gear 102 relative to the audio source 116a-b, and displays the position as a position graphic 120 on retinal display 118 of head gear 102. A noise cancellation algorithm and beamforming unit 314 work to reduce background noise (ambient signals) from the audio signal 310.

Further, head gear 102 may be operational with a remote subsystem 300, or command center, to give an audio picture of the area. Head gear 102 is worn in an area of operation, and transmits audio signals 310 and position signals 312 to remote subsystem 300. Remote subsystem 300 processes the signals to generate actionable information that displays in real time on the retinal display 118 of the head gear 102.

As referenced in FIG. 1A, system 100 comprises a head gear 102. Head gear 102 is configured to be donned on the head, face, ears, neck, and general region of the body above the shoulders. In some embodiments, head gear 102 comprises a frame 104 and a lens 106a, 106b. Lens 106a-b aligns with the eyes. In one non-limiting embodiment, head gear 102 is a pair of glasses. Frame 104 may include a pair of arms 108a, 108b, commonly utilized in the structure of a pair of glasses that ride the ears and side of the head.

Furthermore, head gear 102 is wearable, mobile (connected) and inconspicuous to enable the DHH to take their translation device with them wherever they have internet/cell access and not be dependent on others to provide translation services such as translators, transcriptionists and other assistive technology to help them understand what is being said.

The weight of microphone array 114a-f, motion sensor 302, processor 308, radio frequency interface 112a, 112b, and a display generator 306 are substantially balanced along the length of the arms 108a, 108b. This increases comfort for the user. In other embodiments, however, head gear 102 is not a pair of glasses, but rather any one of hats, helmets, headbands, and headsets. In any case, components are spaced-apart in a generally uniform manner on head gear 102.

As discussed below, a retinal display 118 is operatively disposed in the lens 106a, 106b. In one embodiment, retinal display comprises a display technology that draws a raster display directly onto the retina of the eye. The user sees what appears to be a conventional display floating in space in front of them. Retinal display 118 may display digital text and images for the user to view. Retinal display 118 is effective for helping a wearer with impaired eyesight, such as myopia, to view the image or sensory data captured by the microphone array 114a-f and motion sensor 302. In one non-limiting embodiment, retinal display is configured to enable viewing by a color blind wearer.

In one possible embodiment of system 100, a microphone array 114a-f is operatively disposed in the frame 104. Microphone array 114a-f may include multiple individual microphones operatively connected and operation in the arms 108a, 108b. For example, two microphone arrays 114a, 114b can be disposed on the left side of the frame 104; two microphone arrays 114c, 114d can be disposed on the front face of the frame 104; and two microphone arrays 114e, 114f can be disposed on the right side of the frame 104. The spaced-apart arrangement of the microphone arrays is effective for triangulating the location of an audio source 116a-b.

In some embodiments, the microphone array 114a-f is mounted on an eye glass-type frame 104 with arms 108a, 108b and eye glass lenses 106a, 106b. This is referenced in FIG. 2, which illustrates a block diagram of multiple sensory-related electrical components 200 integrated in arms 108a, 108b. In one non-limiting embodiment, two microphone arrays 114a-f are positioned facing outward to each side on the arms 108a, 108b and two microphone arrays 114a-f are facing forward on the frame 104. In one non-limiting embodiment, individual microphones in the microphone array 114a-f may be connected to the integrated circuit, described below, by flexible connections 202a, 202b, 202c, which work to facilitate placement in the eyeglass frame 104 and arms 108a, 108b of the glasses.

Figure 1B:
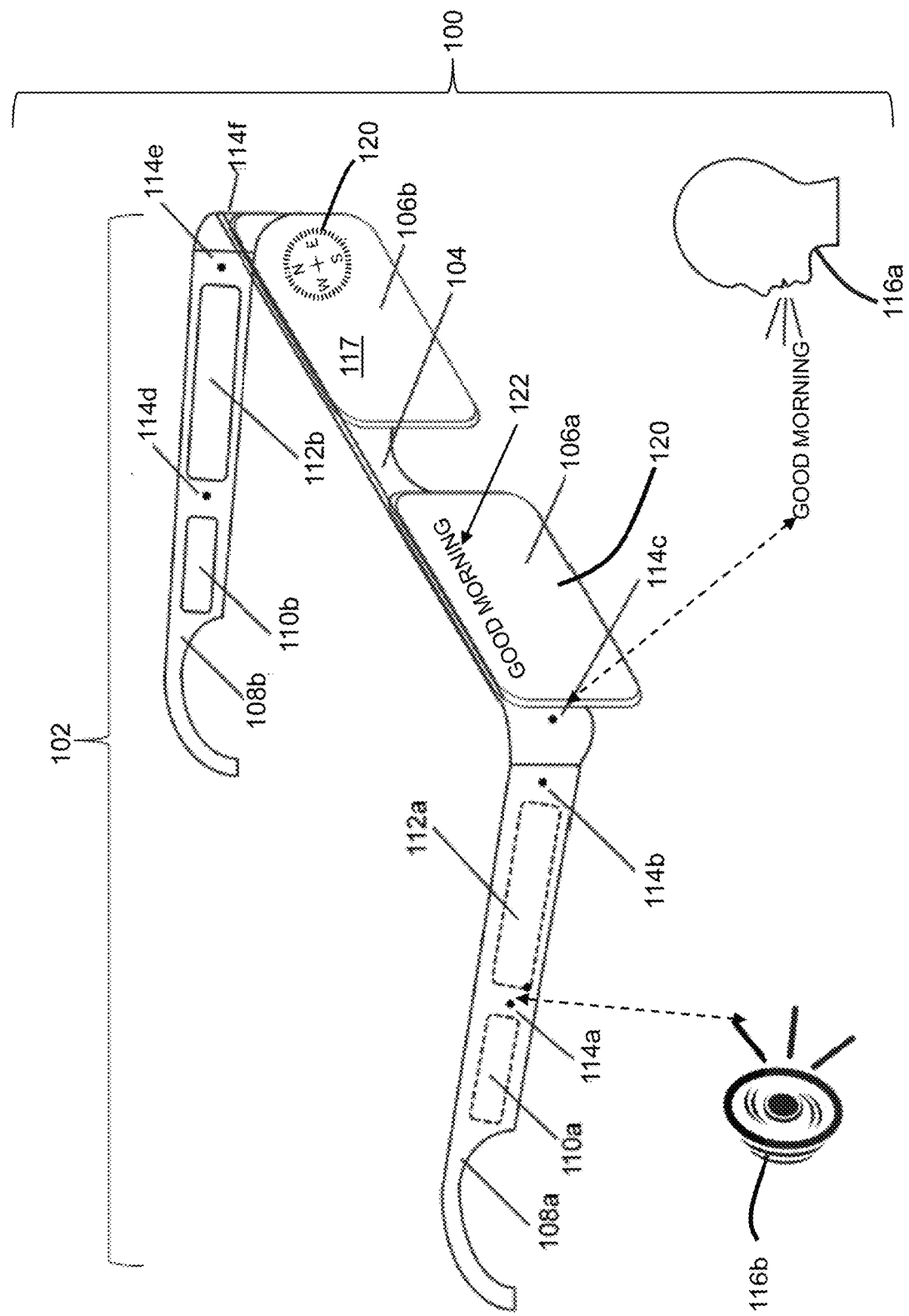
Figure 2:
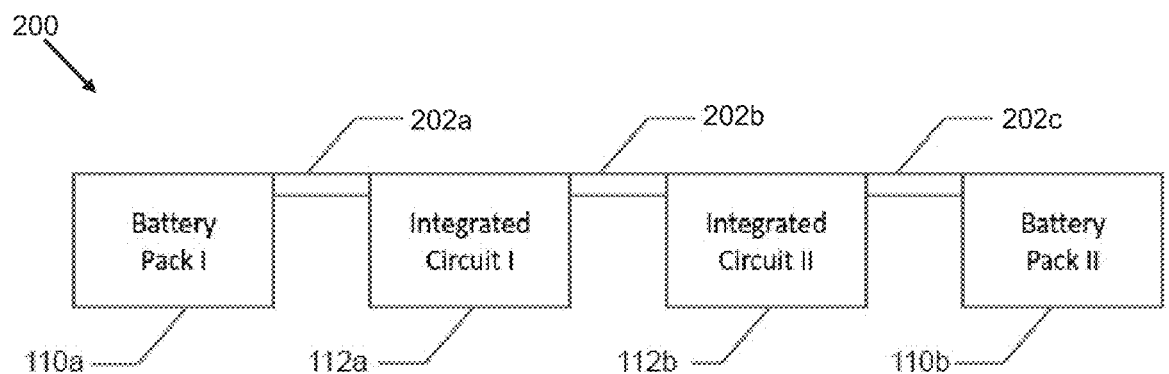
FIG. 2 illustrates a block diagram of the sensory-related electrical components in the glass arms, in accordance with an embodiment of the present invention.

Microphone array 114a-f is configured to detect sound from one or more audio sources 116a-b. For example, FIG. 1B shows multiple audio sources 116a-b transmitting sound signals to the microphone array 114a-f in head gear 102. As described below, the radio audio source 116b is canceled out, while the human audio source 116a, is a voice that says "Good Morning", is processed and converted to text that is visible to the wearer through the lenses. In this manner, multiple audio sources, such as background noise audio sources 116b, can be cancelled, so as to capture sound from the desired audio source 116a.

Audio source 116a-b may include, without limitation, a human, an animal, a radio, a speaker, and general background noise. The sound emitting from audio source may include a human voice, an animal sound, a narration, a song, and a mechanical noise. Audio source 116a-b may include one or more humans emanating a voice, using words in any language. However, audio source 116a-b may also originate from natural or environmental sources. Thus, any source of audio may be identified and tracked using the system 100.

In one possible embodiment of microphone array 114a-f, microphone array beamforming is used to capture the audio signals originating from a detected audio source 116a-b. Additionally, microphone array 114a-f is operable to record an audio signal 310 from the sound emanating from the audio sources 116a-b.

In some embodiments, system 100 provides a motion sensor 302 that is operatively disposed in the frame 104, and used in conjunction with microphone array 114a-f. Motion sensor 302 is operable to detect the position and orientation of head gear while in motion. Based on the positional data, the relative location of audio source can be determined. Microphone array 114a-f is used to detect relative position of audio source. In one embodiment, motion sensor 302 provides position and orientation of device relative to an absolute reference 124 to determine position of audio source. Such motion detection determines the relative position of the head gear 102 to absolute reference 124, e.g. North, and is used to provide the relative location of active audio sources 116a-b in the surrounding environment. In some embodiments, an active motion sensor is utilized. However, a passive motion sensor may also be utilized.

In one non-limiting embodiment, motion sensor 302 is operable to track movement of head gear 102 in nine dimensions. Thus, as the user moves and turns with head gear 102, the position and orientation of frame is being tracked in real time. Such multi-directional tracking may require use of a 3-axis accelerometer, a 3-axis gyroscope, and a 3-axis magnetometer. In an alternative embodiment, motion sensor 302 comprises both accelerometers and compass circuitry to detect motion relative to absolute reference 124. In one non-limiting embodiment, absolute reference 124 is North direction.

In some embodiments, system 100 provides a processor 308 that is operatively connected to the microphone array 114a-f and the motion sensor 302. Processor 308 is also utilized to regulate a display generator 306, and the retinal display 118. In operation, processor 308 works to process the audio signal 310 and the position signal 312 generated by microphone array and motion sensor, respectively.

In one embodiment, processor 308 comprises a speech to text algorithm that is configured to translate the audio signal 310 to a text. Once text 122 is generated, retinal display 118 is operable to display the text 122. Thus, the recorded audio sound is viewable in text on the retinal display 118. This creates a viewable text-based feature for the wearer—which is especially useful for the deaf and hard of hearing.

In alternative embodiments, processor 308 also provides a speech-to-text software that converts speech to text with a translation application, such as known in the art. This allows processor to translate one language or from one language to another. The translation feature assists the deaf and hard of hearing to follow the conversation. This can also be useful for non-deaf wearers, such as business and international travelers, to access a translation service. In this manner, an audio signal 310 from speech sources may be translated to text 122 while other audio sources 116a-b may be identified by integrated electronics 404.

In some embodiments, processor 308 may include a position algorithm that is configured to the position of the frame 104 relative to the audio sources 116a-b. Position algorithm, which is integrated in processor 308, comprises a time difference of arrival function. Thus, audio sources 116a-b are detected by microphone array and the source direction is determined by using Time Difference of Arrival. The time difference in Arrival of audio signals detected at different microphone arrays is used to determine the direction of the audio source relative to the microphone positions.

Continuing, retinal display 118 is operable to display a position graphic 120 representative of the position of the frame 104 relative to an absolute reference. The absolute reference may include a direction of North, for example. Position graphic 120 may include a compass, or arrows indicating a direction of motion as the head gear 102 is in motion. Other graphical depictions used in the art of position and motion representation may also be used.

Processor 308 generates a data signal that corresponds to the audio source 116a-b, such as when the microphone array 114a-f receives sound from different directions in a space.

With the data point, processor 308 calculates the emission point and direction of the audio source 116a-b generated for multiple directions. Further, processor 308 is configured to select a target direction from the directions of audio source 116a-b in the space based on the calculated directions of the audio sources 116a-b.

Additional positioning means processed by the processor 308 can include triangulation, in which sounds from multiple audio sources 116a-b are triangulated. The triangulation means can include the microphone array 114a-f and motion sensor 302 recording measurements of the direction which the received sound from the audio sources 116a-b was transmitted. By combining the direction information and device position from the motion sensor 302, the audio source 116a-b can be located; and then subsequently viewed on the retinal display 118.

In another embodiment of the present invention, processor 308 comprises a noise cancellation algorithm for cancelling a background noise from audio signal 310. Noise cancellation/reduction is an additional processing technique that may be used to remove background noise from the audio signal 310.

In one non-limiting embodiment, microphone array 114a-f comprises a beamforming unit 314 for increasing a signal to noise ratio of the audio signal 310. Beamforming unit 314 is used to increase the signal to noise ratio (SNR) of the desired audio source 116a-b and effectively reduce background noise from other sources. Both the noise cancellation algorithm and beamforming unit 314 create high quality audio for speech to text processing. This also helps to reduce background noise, which allows for a more efficient triangulation of sound from the audio source 116a-b.

In another aspect, system 100 provides a display generator 306 that is operatively connected to retinal display 118. Display generator 306 generates a sensory data based on the audio signal 310 and the position signal 312. In one non-limiting embodiment, display generator 306 is configured to generate sensory data. Such sensory data may include, without limitation, a source identifier, a text translation, an audio description, and a location. As with the text and position graphic, the retinal display 118 assists the user by displaying sensory data.

In one possible embodiment, display generator 306 paints an image directly into one or both eyes of the wearer. Thus, an image provided for display or viewing by the wearer may be projected directly onto the retina. Other embodiments may display the image on the eyeglass lens 106a and 106b. Color images may also be used to provide additional information to the wearer as well as accommodate users with color blindness, low vision, and other visual impairments.

In another embodiment, system 100 incorporates a power source 110a, 110b into frame 104 for powering the sensory components. Power source 110a-b is operatively attached to the frame 104. Processor 308 is operable to reduce power consumption of the power source 110a-b. Power source 110a-b may include a pair of battery packs. In one non-limiting embodiment, power source 110a-b comprises a pair of battery packs encapsulated in each arm respectively to distribute weight evenly upon the wearer. However, in other embodiments, power source 110a-b may be connected by wire to an external power source, such as an electrical wall socket.

To enhance efficiency, processor 308 works to reduce power consumption of the power source 110a-b. It is significant to note that system 100 is a wearable device with a limited power source 110a-b. As such the processor 308 needs to monitor and optimize power usage and therefore regulate the system 100, including the processor 308, retinal display 118, microphone array 114a-f, motion sensor 302, and other communications devices contained therein.

In another embodiment, system 100 provides a remote subsystem 300 that is operable to receive and store the audio signal 310, the position signal 312, the text 122, and the position graphic 120. In one non-limiting embodiment, remote subsystem 300 comprises a cloud 702 having a private domain. This creates a unique security feature in which data is controlled from the remote subsystem 300. In some embodiments, the cloud 702 hosts speech-to-text algorithms, Artificial Intelligence, and other processing to support audio situation awareness for Deaf as well as military, law enforcement, etc. This is useful for determining the location of the audio sources. Cloud is private and secure, allowing privacy of conversations and security from unauthorized access.

Figure 7:
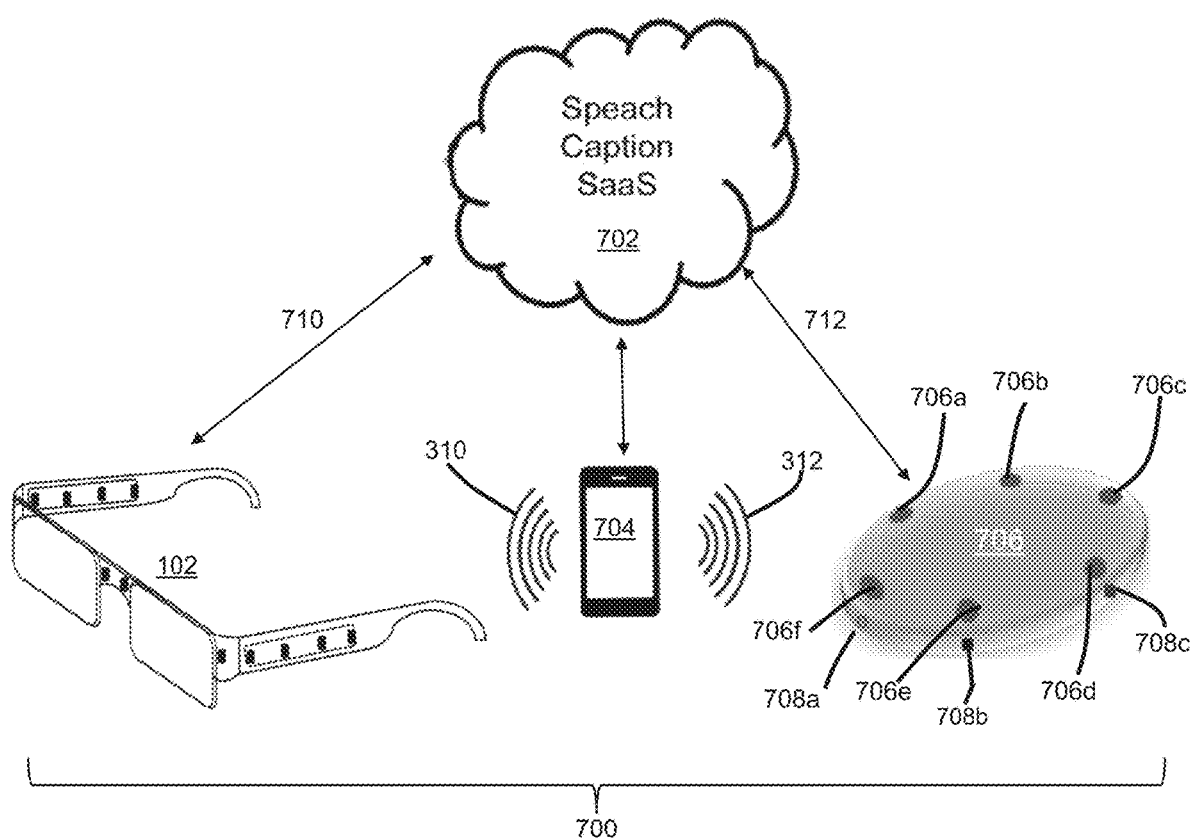
FIG. 7 illustrates a block diagram of an exemplary communication subsystem, having cloud transmitting audio signals and position signals to and from a head gear, and a desktop device with six microphones and LEDs, in accordance with an embodiment of the present invention.

FIG. 7 illustrates a block diagram of an exemplary communication subsystem 700, having cloud transmitting audio signals and position signals to and from a head gear 102, and a desktop device 706 with multiple microphones 706a-f and three LEDs 708a-c. Communication subsystem 700 enables cloud 702 to communicate audio signals 310 and position signals 312 to and from the head gear 102 and/or a desktop device 706 with six microphones 706a-f and three LEDs 708a-c. In one embodiment of desktop device 706, each microphone 706a, 706b, 706c, 706d, 706e, 706f works independently as part of a microphone array. The LEDs are configured to illuminate in the direction of the audio source. This creates situational awareness that allows the wearer to transition from one conversation to another conversation, for example. In essence, each individual color of the LEDs identifies the speaker. In alternative embodiments, each LED 708a, 708b, 708c is used to indicate signal strength, processing, power capacity, and the like, in regards to desktop device 706.

In operation, the transmission of signals 310, 312 occurs through Bluetooth or Wi-Fi. For example, a mobile communication device 704 relays the signals 310, 312. The mobile communication device 704 may also be used to transmit commands to wither the cloud 702, or the head gear 102 or desktop device 706. Head gear 102 includes microphone array 114a-f that captures the desired signal, while cancelling background noise. desktop device 706 also utilizes microphone 706a-fs in an array configuration to selectively capture signals, while cancelling background noise.

In another embodiment of communication subsystem 700, the remote subsystem 300 is not a cloud, but rather a command center. Command center comprises a database, police, medical staff, or other first responders. The user can transmit the captured audio signal 710 and/or motion signal 712 to remote subsystem 300 for storage and processing. For example, multiple individuals wearing the devices in a coordinated area of operations, such as law enforcement, first responders, search and rescue, etc. could, as they move about the area, feed captured audio environment information via radio communications to a central processing center or command post.

Further processing may be performed at the remote subsystem 300 to present actionable information on the display devices of individuals in the area of operation. For example, commands/instructions sent for a police headquarters are transmitted to the head gear 102 for viewing on the retinal display thereof. Actionable information may be to direct one or more individuals in the area of operation to perform a coordinated action (e.g. using triangulation of an audio source from multiple audio streams to locate a person to be rescued), to alert one or more individuals in the area of operations about a possible action or event that may occur (e.g. move away from an area because of fire, explosives, or other imminent danger), or other information to aid individuals perform their roles in the coordinated operation.

For example, an operation can include a military action where soldiers are engaging with an enemy force, performing peacekeeping operation, or aiding in disaster recovery. Law enforcement operations could include crowd control, crime enforcement or keeping the peace. First responders' operations could include battling fires (forest, buildings, manufacturing facilities, industrial plants, etc.) or search and rescue following a natural or manmade disaster.

In another example, the audio streams transmitted by individuals as they move about the area of operation may be monitored by remote subsystem 300 within the center or processed by artificial intelligence algorithms (possibly in another remote center) to extract actionable information from the combined audio environment signals and provide such information to the controllers or commanders in the processing center for further action or display information or commands to one or more of the individuals participating in the area of operations.

Figure 3:
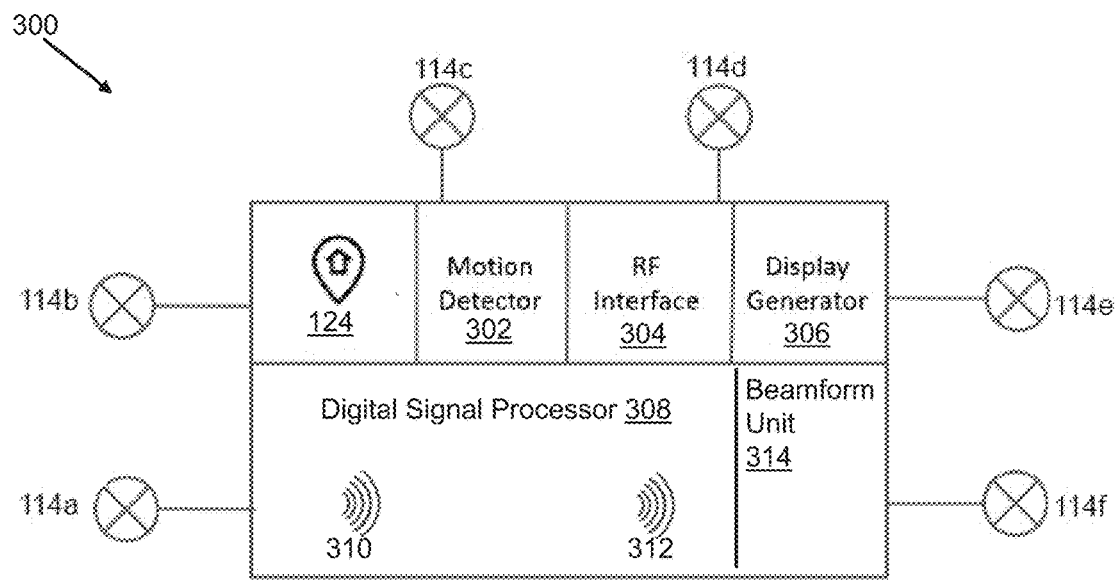
FIG. 3 illustrates a block diagram of an exemplary radio frequency interface, in accordance with an embodiment of the present invention.

In yet another embodiment, the system 100 provides a radio frequency interface 112a, 112b that is operationally disposed in the frame 104 of head gear 102. For example, FIG. 3 illustrates a block diagram of an exemplary radio frequency interface 112a-b. Radio frequency interface 112a-b is configured to transmit the audio signal 310, the position signal 312, and the sensory signal to the remote subsystem 300. This transmission may be through Bluetooth technology, Wi-Fi, or other communication means. Integrated electronics are also supported in radio frequency interface 112a-b. In one non-limiting embodiment, radio frequency interface 112a-b comprises an integrated circuit radio frequency interface.

Radio frequency interface 112a-b is configured to send and receive signals to and from a remote system 100. In one embodiment, this remote communication may include through Bluetooth technology. In addition, radio frequency interface 112a-b may include radio frequency interface 304 for wireless communications with at least one remote processor 308-based system 100. Thus, the circuits may communicate with a remote processor-based system using a wireless protocol such as a cellular telephone link, a short-range radio system, or a Bluetooth connection as examples. The remote processor-based system may be worn or carried by the wearer, and also allows the glasses to be located elsewhere within radio frequency range.

In this manner, system 100 is wearable, mobile (connected), and inconspicuous to enable the deaf and hard of hearing wearer to take the glasses with them wherever they have internet/cell access and not be dependent on others to provide translation services such as translators, transcriptionists and other assistive technology to help the wearer better comprehend what is being said. The signals are transmitted by radio frequency interface 112a, 112b may include audio signals recorded by the microphone array 114a-f. The signals 310, 312 further include a command for communications with display generator 306 and microphone array 114a-f that are in communication with interface 112a-b.

Figure 4:
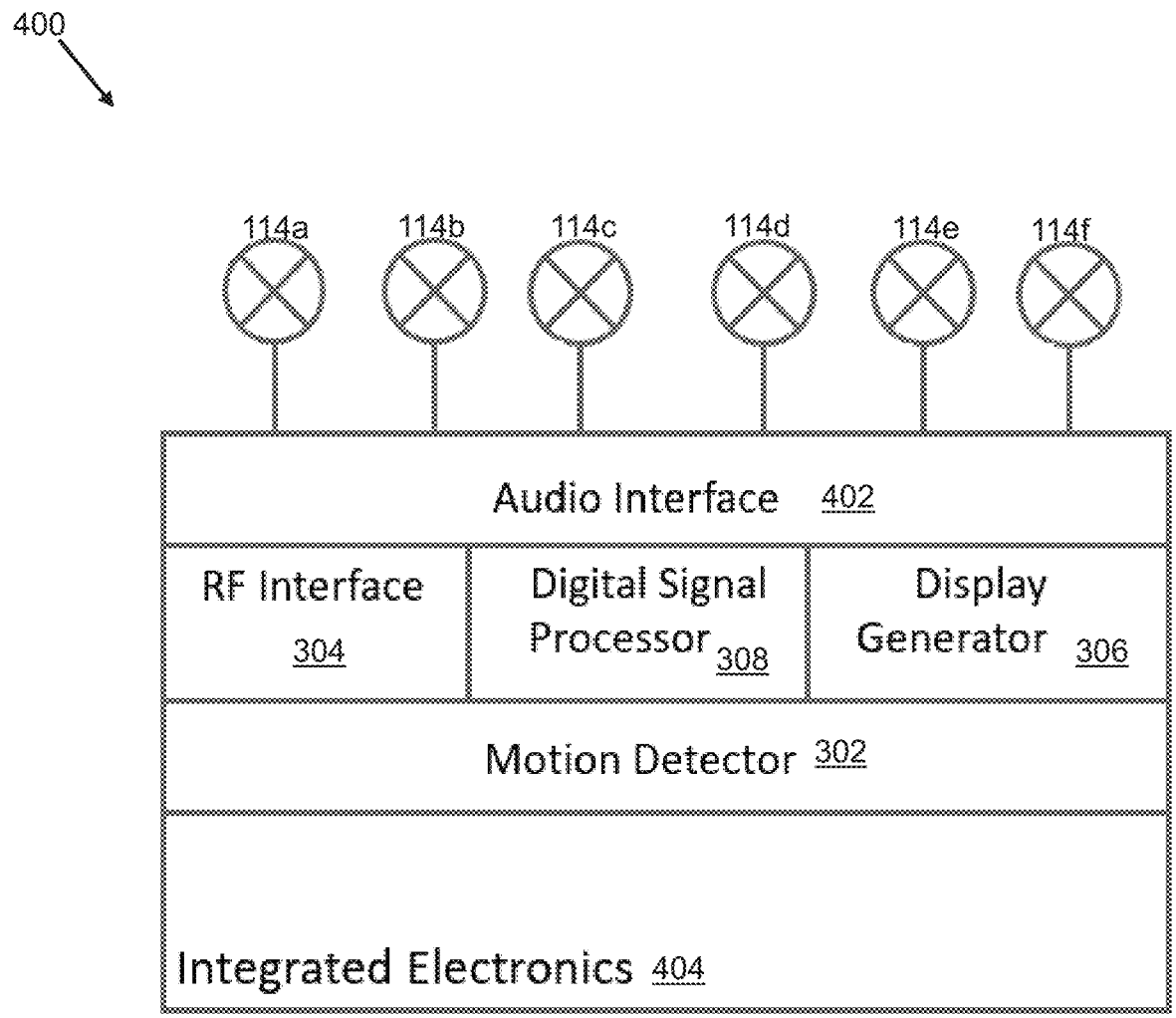
FIG. 4 illustrates a block diagram of an alternative embodiment of a radio frequency interface, showing an audio interface in communication with the microphone array, in accordance with an embodiment of the present invention.

For example, FIG. 4 illustrates an alternative embodiment of a radio frequency interface 400, which also includes an audio interface 402 that is in communication with the microphone array 114a-f. The various components are interconnected, with processor 308 serving as central nexus. As shown, audio interface 402 is operatively connected to microphone array 114a-f. Radio frequency interface 304, display generator 306, and motion sensor 302 generate signals 310, 312 that are processed by processor.

Figure 5:
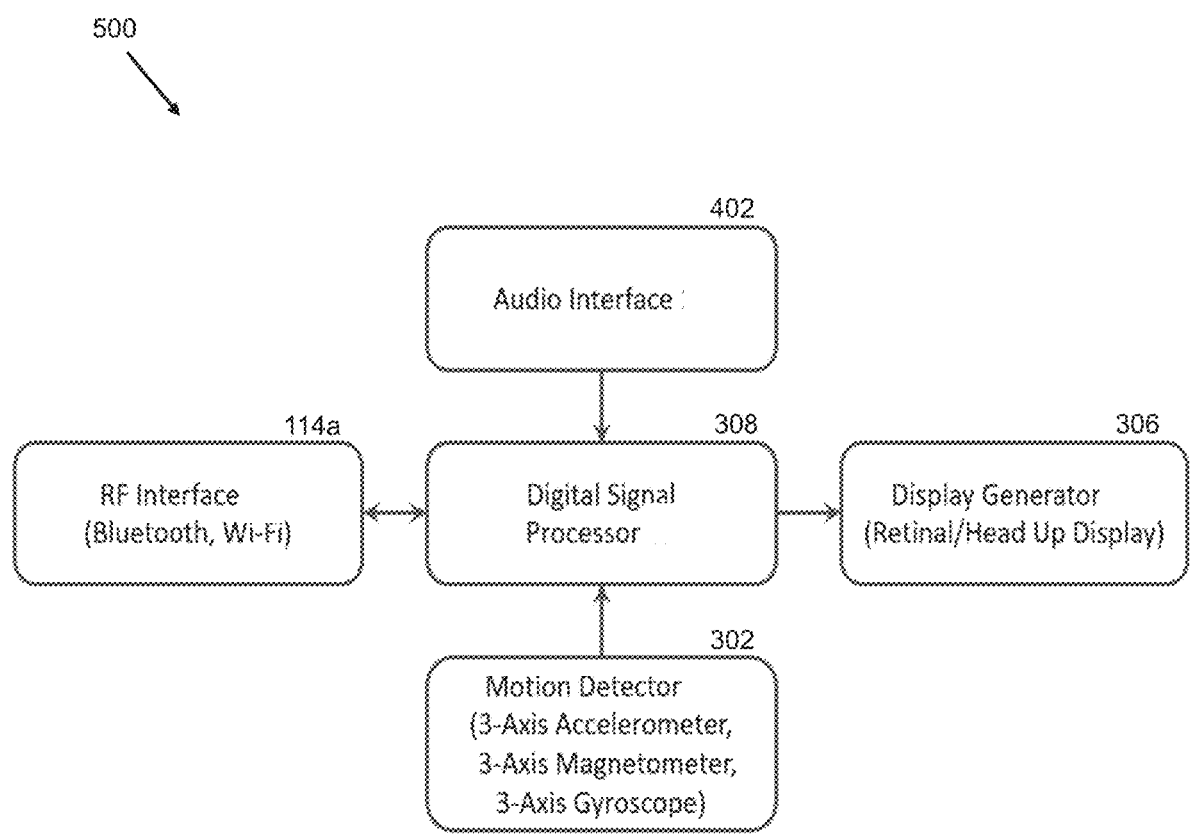
FIG. 5 illustrates an interface diagram, referencing the interconnection of different electrical components for radio frequency interface, in accordance with an embodiment of the present invention.

FIG. 5 references another possible embodiment of interconnections between different electrical components for radio frequency interface 400 in an interface diagram 500. As shown, digital signal processor 308 is central to processing operations, serving as a processing nexus to all components, including audio interface 402, display generator 306, motion sensor 302, and radio frequency interface 400. Processor 308 operatively connects to radio frequency interface 112a-b to communicate audio signals and position signals with remote subsystem. Processor 308 operatively connects to radio frequency interface 400 to synthesize speech-to-text functions with algorithm. Processor 308 operatively connects to display generator 306 to display sensory information on retinal display. Processor 308 operatively connects to motion sensor 302 to calculate position and orientation of head gear 102. This can involve processing directional and compass data.

Radio frequency interface 112a, 112b is supplied with power from the power source 110a, 110b through flexible connections in the frame 104 and arms 108a, 108b. In this configuration, power is equally stored in each arm 108a, 108b. However, in alternative embodiments, power source 110a, 110b is disposed in a separate device connected by flexible electrical connections to power the integrated circuit. In other embodiments, the radio frequency interface 112a, 112b may include all of the electronics other than the power source 110a, 110b needed to implement such an audio situational awareness, described above. For example, the integrated circuit may include not only the hardware for implementing the microphone array 114a-f and the display generator 306 but also a digital signal processor 308 or even an entire computer on a chip.

Figure 6:
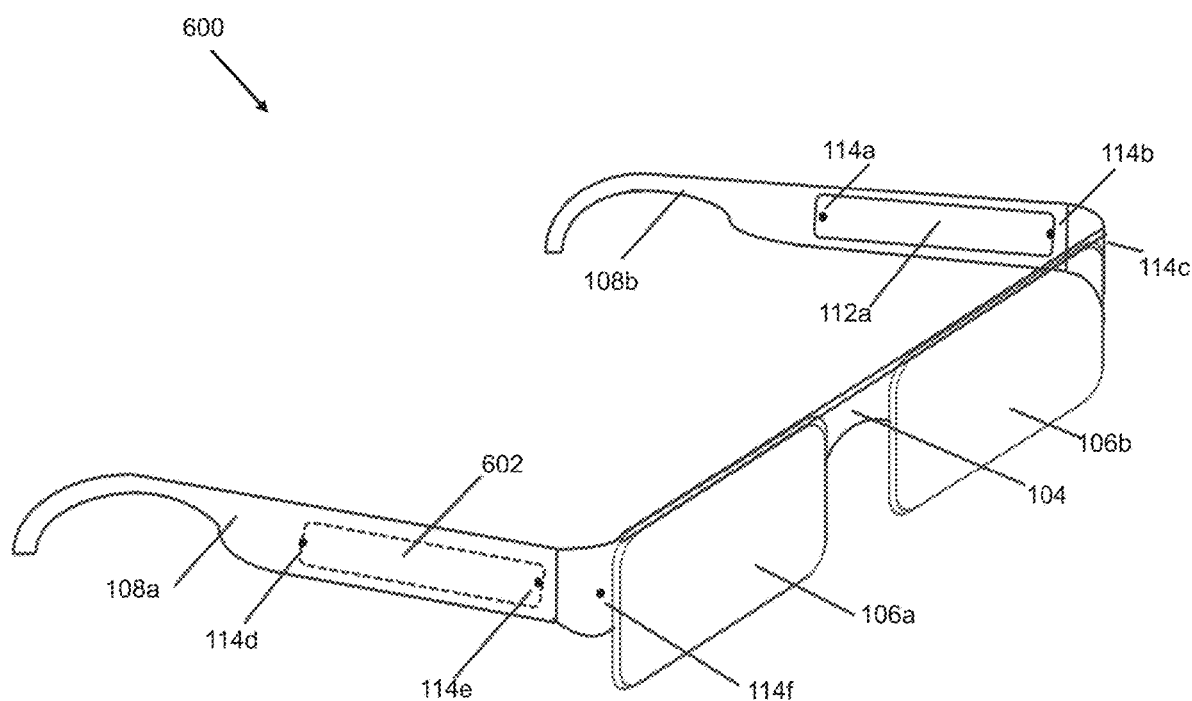
FIG. 6 illustrates a perspective view of an alternative embodiment of head gear, where power source is encased on one side of arms, in accordance with an embodiment of the present invention.

FIG. 6 illustrates yet another embodiment of a head gear that employs a pair of glasses 600 that does not have separate battery packs, but rather, encapsulates all battery packs 602 in one section of glasses 600. As illustrated a pair of arms 108a-b carry the microphone array 114a-f, but only one arm 108a carries the battery pack 602. This is different than the power source 110a, 110b shown in FIG. 1A in which each power source is balanced on separate arms 108a-b of head gear 102.

Figure 8:
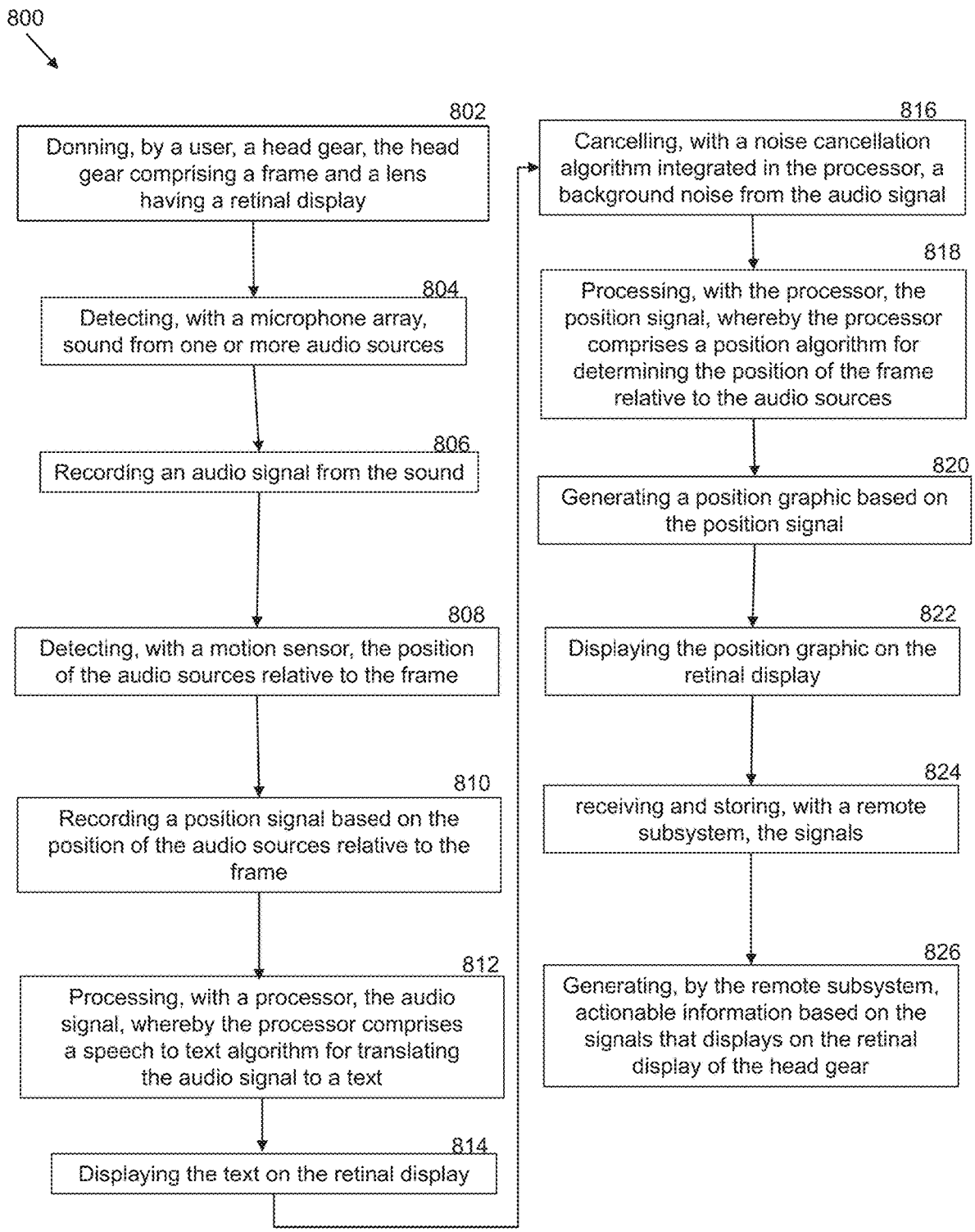
FIG. 8 illustrates a flowchart of an exemplary method for operating a head-mounted situational awareness system, in accordance with an embodiment of the present invention.

FIG. 8 illustrates a flowchart of an exemplary method 800 for operating a head-mounted situational awareness system. In an initial Step 802 comprises donning, by a user, a head gear, the head gear comprising a frame and a lens having a retinal display. The head gear allows the deaf or a first responder to operate more efficiently in difficult environments. The method 800 may further comprise a Step 804 of detecting, with a microphone array, sound from one or more audio sources. A Step 806 includes recording an audio signal from the sound.

In some embodiments, a Step 808 comprises detecting, with a motion sensor, the position of the audio sources relative to the frame. A Step 810 includes recording a position signal based on the position of the audio sources relative to the frame. In some embodiments, a Step 812 may include processing, with a processor, the audio signal, whereby the processor comprises a speech to text algorithm for translating the audio signal to a text. A Step 814 comprises displaying the text on the retinal display. Method 800 may further comprise a Step 816 of cancelling, with a noise cancellation algorithm integrated in the processor, a background noise from the audio signal.

A Step 818 includes processing, with the processor, the position signal, whereby the processor comprises a position algorithm for determining the position of the frame relative to the audio sources. Another Step 820 may include generating a position graphic based on the position signal. A Step 822 comprises displaying the position graphic on the retinal display. Yet another Step 824 may include receiving and storing, with a remote subsystem, the signals. A final Step 826 includes generating, by the remote subsystem, actionable information based on the signals that displays on the retinal display of the head gear.

Although the process-flow diagrams show a specific order of executing the process steps, the order of executing the steps may be changed relative to the order shown in certain embodiments. Also, two or more blocks shown in succession may be executed concurrently or with partial concurrence in some embodiments. Certain steps may also be omitted from the process-flow diagrams for the sake of brevity. In some embodiments, some or all the process steps shown in the process-flow diagrams can be combined into a single process.

These and other advantages of the invention will be further understood and appreciated by those skilled in the art by reference to the following written specification, claims and appended drawings.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A head-mounted situational awareness system, the system comprising:
    a head gear comprising a frame and a lens;
    a retinal display disposed in the lens;
    a microphone array disposed in the frame, the microphone array operable to detect sound from one or more audio sources, the microphone array further operable to record an audio signal from the sound;
    a motion sensor disposed in the frame, the motion sensor operable to detect the position and orientation of the frame relative to the audio sources, the motion sensor further operable to record a position signal based on the position of the frame relative to the audio sources; and
    a processor operatively connected to the microphone array and the motion sensor, the processor being operable to process the audio signal and the position signal,
    the processor comprising a speech to text algorithm for translating the audio signal to a text, whereby the retinal display is operable to display the text,
    the processor further comprising a position algorithm for determining the position of the frame relative to the audio sources, whereby the retinal display is operable to display a position graphic representative of the position of the frame relative to an absolute reference.

2. The system of claim 1, wherein the headgear comprises a pair of glasses.

3. The system of claim 2, wherein the frame comprises a pair of arms.

4. The system of claim 3, wherein the weight of the microphone array, the motion sensor, and the display generator are substantially balanced along the length of the arms.

5. The system of claim 1, wherein the motion sensor is operable to track movement of the frame in nine dimensions with a 3-axis accelerometer, a 3-axis gyroscope, and a 3-axis magnetometer.

6. The system of claim 1, further comprising a remote subsystem, the remote subsystem operable to receive and store at least one of the following: the audio signal, the position signal, the text, and the position graphic.

7. The system of claim 6, wherein the remote subsystem comprises a cloud having a private and secure domain.

8. The system of claim 6, further comprising a radio frequency interface operationally disposed in the frame, the radio frequency interface operable to transmit the audio signal, the position signal, and the sensory signal to the remote subsystem.

9. The system of claim 8, wherein the radio frequency interface comprises an integrated circuit radio frequency interface.

10. The system of claim 1, wherein the position algorithm comprises a time difference of arrival function.

11. The system of claim 1, wherein the processor comprises a noise cancellation algorithm for cancelling a background noise from the audio signal.

12. The system of claim 11, wherein the microphone array comprises a beamforming unit for increasing a signal to noise ratio of the audio signal.

13. The system of claim 1, further comprising a display generator operatively connected to the retinal display, the display generator is operable to generate a sensory data based on the audio signal and the position signal.

14. The system of claim 1, further comprising a power source disposed at the frame.

15. The system of claim 14, wherein the processor is operable to reduce power consumption of the power source.

16. The system of claim 6, further comprising a desktop device comprising multiple microphones and multiple light emitting diodes, the desktop device being in communication with the remote subsystem.

17. A head-mounted situational awareness system, the system comprising:
    a head gear comprising a frame and a lens;
    a retinal display disposed in the lens;
    a microphone array disposed in the frame, the microphone array comprising a beamforming unit, the microphone array operable to detect sound from one or more audio sources, the microphone array further operable to record an audio signal from the sound;
    a motion sensor disposed in the frame, the motion sensor operable to detect the position and orientation of the frame relative to the audio sources, the motion sensor further operable to record a position signal based on the position of the frame relative to the audio sources;
    a processor operatively connected to the microphone array and the motion sensor, the processor operable to process the audio signal and the position signal,
    the processor comprising a speech to text algorithm for translating the audio signal to a text, whereby the retinal display is operable to display the text,
    the processor further comprising a position algorithm for determining the position of the frame relative to the audio sources, the position algorithm comprising a time difference of arrival function, whereby the retinal display is operable to display a position graphic representative of the position of the frame relative to an absolute reference, the processor further comprising a noise cancellation algorithm for cancelling a background noise from the audio signal;

a remote subsystem, the remote subsystem operable to receive and store at least one of the following: the audio signal, the position signal, the text, and the position graphic; and a radio frequency interface operationally disposed in the frame, the radio frequency interface operable to transmit the audio signal, the position signal, and the sensory signal to the remote subsystem.

18. The system of claim 17, wherein the motion sensor is operable to track movement of the frame in nine dimensions with a 3-axis accelerometer, a 3-axis gyroscope, and a 3-axis magnetometer.

19. The system of claim 17, further comprising a display generator operatively connected to the retinal display, the display generator is operable to generate a sensory data based on the audio signal and the position signal.

20. A method for operating a head-mounted situational awareness system, the method comprising:

donning, by a user, a head gear, the head gear comprising a frame and a lens having a retinal display;

detecting, with a microphone array, sound from one or more audio sources;

recording an audio signal from the sound;

detecting, with a motion sensor, the position of the audio sources relative to the frame;

recording a position signal based on the position of the audio sources relative to the frame;

processing, with a processor, the audio signal, whereby the processor comprises a speech to text algorithm for translating the audio signal to a text;

displaying the text on the retinal display;

cancelling, with a noise cancellation algorithm integrated in the processor, a background noise from the audio signal;

processing, with the processor, the position signal, whereby the processor comprises a position algorithm for determining the position of the frame relative to the audio sources;

generating a position graphic based on the position signal;

displaying the position graphic on the retinal display;

receiving and storing, with a remote subsystem, the signals; and generating, by the remote subsystem, actionable information based on the signals that displays on the retinal display of the head gear.

\* \* \* \* \*